(12) United States Patent
Tsuda et al.

(10) Patent No.: US 10,800,235 B2
(45) Date of Patent: Oct. 13, 2020

(54) AUTOMOBILE ACCESSORY ATTACHMENT STRUCTURE

(71) Applicant: WEBASTO JAPAN Co., Ltd., Hiroshima (JP)

(72) Inventors: Yuta Tsuda, Hiroshima (JP); Miwa Shinohara, Hiroshima (JP); Koji Sawahata, Hiroshima (JP); Keita Takehara, Hiroshima (JP)

(73) Assignee: WEBASTO JAPAN Co., Ltd., Hiroshima (JP)

( * ) Notice: Subject to any disclaimer, the term of this patent is extended or adjusted under 35 U.S.C. 154(b) by 112 days.

(21) Appl. No.: 16/085,513

(22) PCT Filed: Mar. 2, 2017

(86) PCT No.: PCT/JP2017/008250
§ 371 (c)(1),
(2) Date: Sep. 14, 2018

(87) PCT Pub. No.: WO2017/159378
PCT Pub. Date: Sep. 21, 2017

(65) Prior Publication Data
US 2019/0061500 A1 Feb. 28, 2019

(30) Foreign Application Priority Data
Mar. 18, 2016 (JP) .................... 2016-054755

(51) Int. Cl.
*B60J 7/20* (2006.01)
*B60R 16/02* (2006.01)
*B60J 7/14* (2006.01)

(52) U.S. Cl.
CPC .............. *B60J 7/207* (2013.01); *B60J 7/146* (2013.01); *B60J 7/20* (2013.01); *B60R 16/02* (2013.01); *B60R 16/0215* (2013.01)

(58) Field of Classification Search
CPC .... B60J 7/207; B60J 7/146; B60J 7/20; B60R 16/0215; B60R 16/02
(Continued)

(56) References Cited

U.S. PATENT DOCUMENTS 6,419,308 B1 * 7/2002 Corder ................... B60J 7/0084
296/107.08
2010/0176622 A1 * 7/2010 Fallis, III ............... B60J 7/1226
296/107.08

(Continued)

FOREIGN PATENT DOCUMENTS

DE  102013225926 A1  6/2015
JP    2007-84018 A     4/2007
(Continued)

OTHER PUBLICATIONS

International Search Report issued in PCT/JP2017/008250 dated May 16, 2017 with English Translation (3 pages).

*Primary Examiner* — Jason S Morrow
*Assistant Examiner* — E Turner Hicks
(74) *Attorney, Agent, or Firm* — Nakanishi IP Associates, LLC

(57) ABSTRACT

An accessory that needs to be protected against water is located in a water-coverable area with waterproofness being provided with certainty, while the number of components is suppressed from increasing. An accessory provided with a metal casing or including a female connector is provided in a water-coverable area of an automobile including a retractable roof. A cover covering the accessory is provided. The cover includes a plurality of panels and a plurality of hinges and is foldable upward. A harness supporting bracket supporting a wire harness has a pressing function of pressing the cover such that the cover is not foldable.

4 Claims, 14 Drawing Sheets

(58) Field of Classification Search
USPC .......................................... 296/107.08, 37.1
See application file for complete search history.

(56) References Cited

U.S. PATENT DOCUMENTS

2010/0264685 A1* 10/2010 Neubrand ................ B60J 7/202
  296/107.08
2011/0175402 A1   7/2011 Schulz et al.
2019/0260261 A1*  8/2019 Traub ...................... B60R 16/02

FOREIGN PATENT DOCUMENTS

JP    2007-261412 A    10/2007
JP    2011-148491 A     8/2011

* cited by examiner though not explicitly described in Patent Document 1, as a general measure to make the power control device waterproof, the entirety of the electric control device is housed in a waterproof resin case. However, this may undesirably decrease the heat dissipation. According to another measure, a water blocking member to be located to cover at least the connector portion from above is formed of a flexible material such as rubber or the like so as to be rolled up in consideration of the connectability (ease of assembling) or the ease of maintenance of the connector portion.

AUTOMOBILE ACCESSORY ATTACHMENT STRUCTURE

TECHNICAL FIELD

The present invention relates to an automobile accessory attachment structure attaching an accessory including a connector to a water-coverable area of a vehicle body.

BACKGROUND ART

As exemplified by an automobile including a retractable roof disclosed in, for example, Patent Document 1, a known automobile having a water-coverable area in a vehicle body includes a roof member covering a vehicle compartment, a rear deck cover (deck lid) covering, from above, the roof member accommodated in a chamber (deck space) provided between the vehicle compartment and a trunk, and open/close devices opening or closing the roof member and the rear deck cover separately.

Such a roof member is changed in position, by the open/close device for the roof member, between a close position of covering the vehicle compartment and an open position of being accommodated in the chamber to open the vehicle compartment. The rear deck cover is changed in position, by the open/close device for the rear deck cover, between a usual position of covering the accommodated roof member and a retraction position obliquely to the rear of, and above, the usual position. For opening or closing the roof member, the rear deck cover is retracted to the retraction position to open the top of the chamber.

When, for example, rain falls while the inside of the vehicle body is opened (for example, when the roof member is at the open position, when the rear deck cover is at the retraction position, or when the position of the roof member or the rear deck cover is being changed), the inside of the vehicle body such as the vehicle compartment, the chamber or the like may become a water-coverable area.

In general, an automobile including a retracted roof may cause an electric motor provided in an open/close device for a roof member and an electric motor provided in an open/close device for a rear deck cover to be driven at the same time, and therefore, may consume large power. A power control device provided as an accessory, for example, an inverter or the like needs to convert the power supplied from a power generator or a battery into an appropriate voltage value and supply a large electric current to the electric motors via a power line.

A longer power line increases the power loss. Therefore, it has been desired to locate the power control device as close as possible to the open/close devices.

In the case where, for example, such a power control device is provided at a position, in the vehicle, to the rear of the chamber as a position close to the open/close devices, it is difficult to provide a sufficiently large space for a trunk. In the case where the power control device is located in a space below the seat included in the vehicle compartment, it is difficult to allow a seat cushion to be sufficiently cushionable. Therefore, it is considered to be preferred from the point of view of layout that the power control device is located in an area between the seat and the chamber.

In the meantime, the power control device is often housed in a metal casing because a metal material is high in heat dissipation (coolability), rigidity and shielding property against electric noise. However, the metal casing is easily corroded, and a connector portion of the power control device to be connected with the power line involves a problem of being, for example, electrolytically corroded when being covered with water. Therefore, in order to locate the power control device in the above-described area between the seat and the chamber, a measure needs to be taken to provide waterproofness.

Although not explicitly described in Patent Document 1, as a general measure to make the power control device waterproof, the entirety of the electric control device is housed in a waterproof resin case. However, this may undesirably decrease the heat dissipation. According to another measure, a water blocking member to be located to cover at least the connector portion from above is formed of a flexible material such as rubber or the like so as to be rolled up in consideration of the connectability (ease of assembling) or the ease of maintenance of the connector portion.

However, such a flexible water blocking member needs to be pressed by a separate pressing member so as not to be unintentionally rolled up by vibration during the automobile is running. This may undesirably increase the number of steps of assembly or the number of parts. In addition, the water blocking member to be provided in the water-coverable area needs to be formed of a material, such as rubber or the like, that withstands heat generation in the power control device or heating caused by the sunshine or high-temperature outdoor air and is sufficiently durable to return to the original shape flexibly even if being rolled up. This involves a problem of raising the cost.

CITATION LIST

Patent Literature

Patent Document 1: Japanese Laid-Open Patent Publication No. 2007-261412

SUMMARY OF INVENTION

Technical Problem

Thus, the present invention has an object of providing an automobile accessory attachment structure, while suppressing the number of components thereof from increasing, guaranteeing that waterproofness is provided for an accessory, which needs to be protected against water, even in the case where the accessory is located in a water-coverable area.

Solution to Problem

According to an automobile accessory attachment structure of the present invention, an accessory provided with a metal casing or including a connector is provided in a water-coverable area of an automobile including a retractable roof. A cover covering the accessory is provided, the cover being foldable upward. A harness supporting bracket pressing the cover such that the cover is not foldable is provided.

According to the above-described structure, the accessory, which needs to be protected against water, may be located even in a water-coverable area with waterproofness being guaranteed, while the number of components is suppressed from increasing.

In an embodiment according to the present invention, the cover includes a plurality of panels and a plurality of hinges.

According to the above-described structure, the cover may be formed of a low-cost material. The cover is guaranteed to be foldable and also to be rigid when being secured while covering the accessory.

In an embodiment according to the present invention, the accessory is a power control device usable for the roof or a deck cover or commonly usable for the roof and the deck cover, and the power control device is provided with the metal casing.

According to the above-described structure, the coolability and the appropriateness of layout are both provided at low cost.

Advantageous Effects of Invention

According to the present invention, waterproofness is guaranteed for an accessory, which needs to be protected against water, even in the case where the accessory is located in a water-coverable area, while the number of components is suppressed from increasing.

DESCRIPTION OF EMBODIMENTS

An example according to the present invention will be described with reference to the drawings.

Figure 1A:
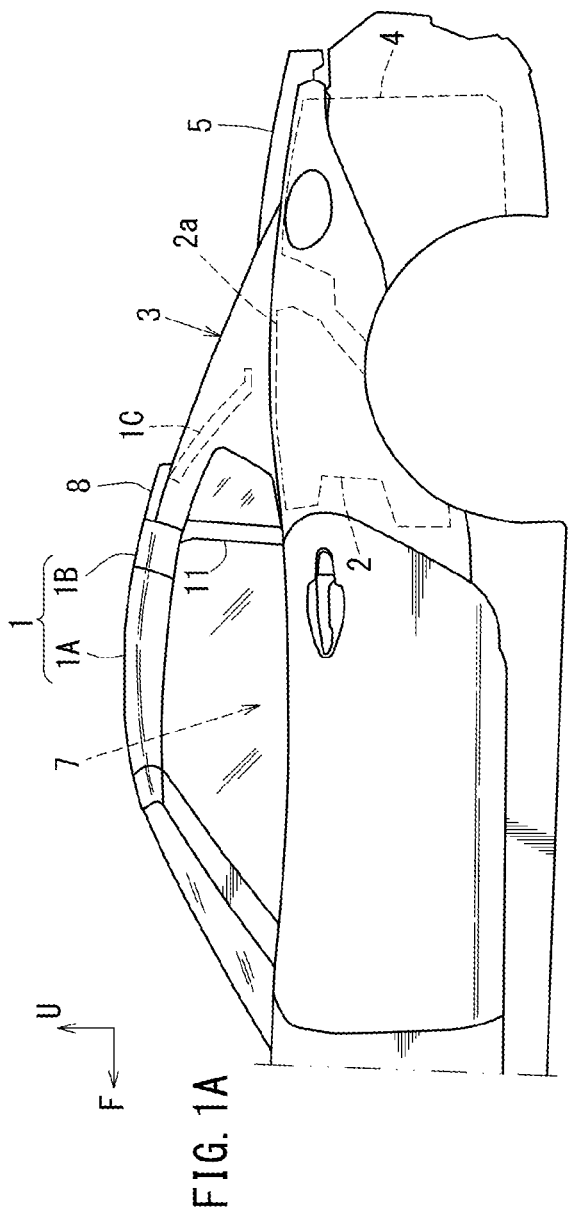
FIGS. 1A and 1B provide side views showing an automobile including an accessory attachment structure in an example in a closed state and an open state of an openable/closable roof.
Figure 1B:
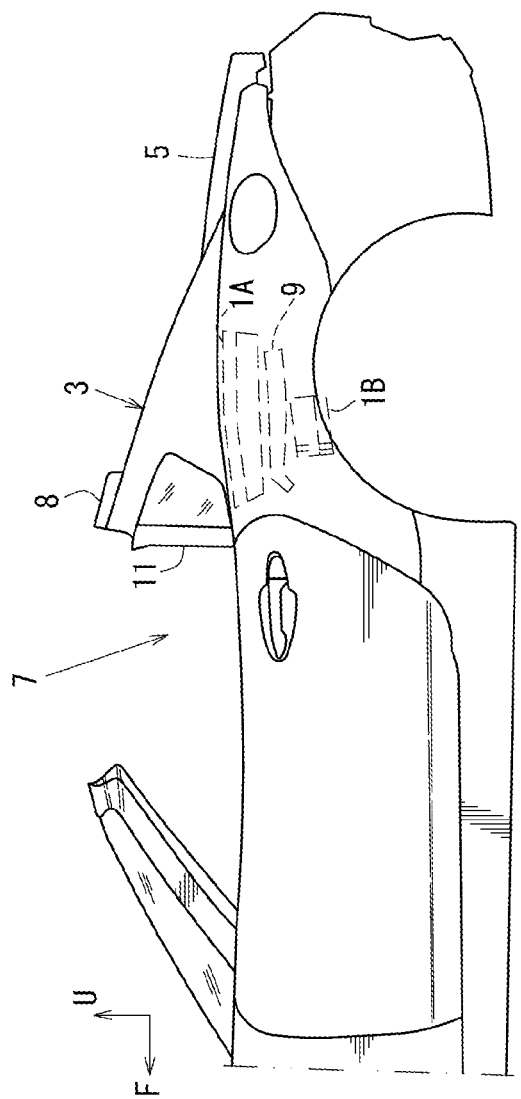
Figure 2:
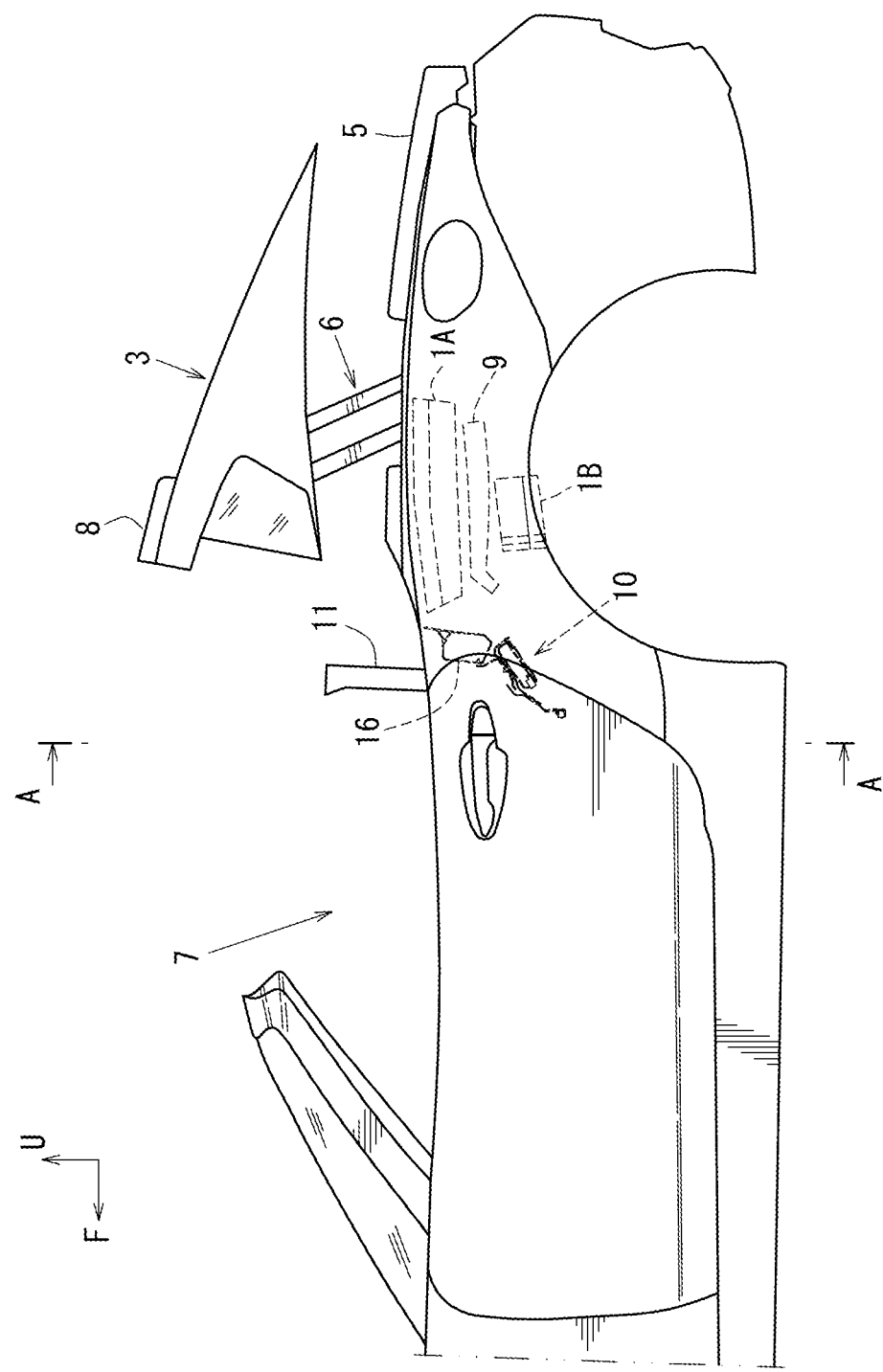
FIG. 2 is a side view showing how the openable/closable roof is transferred from the closed state to the open state.

The drawings each show an automobile accessory attachment structure. FIGS. 1A and 1B provide side views showing an automobile including an accessory attachment structure in this example. FIG. 1A is a side view of a case where an openable/closable roof is in a closed state. FIG. 1B is a side view of a case where the openable/closable roof is in an open state. FIG. 2 is a side view showing how the openable/closable roof is transferred from the closed state to the open state.

FIG. 2 omits seatback bars 18. In the drawings referred to in the following examples, arrow F represents a vehicle forward direction, arrow IN represents an inward direction in a vehicle width direction, arrow OUT represents an outward direction (vehicle leftward direction) in the vehicle width direction, and arrow U represents a vehicle upward direction.

As shown in FIG. 1A, FIG. 1B and FIG. 2, an automobile including a retractable roof in this example includes an openable/closable roof 1, a roof chamber 2, a rear deck cover 3, a trunk 4, a trunk lid 5, a link mechanism 6 (see FIG. 2) having a parallel link structure opening or closing the rear deck cover 3, and a roof open/close mechanism (not shown) opening or closing the openable/closable roof 1 and a rear window 9 described below.

The openable/closable roof 1 is supported by a vehicle body so as to be displaceable between a roof closed state of covering a vehicle compartment 7 (i.e., driver room) (see FIG. 1A) and a roof open state of being accommodated in the roof chamber 2 to open the vehicle compartment 7 (see FIG. 1B).

The openable/closable roof 1 is a hard top-type movable roof. The openable/closable roof 1 includes a front roof 1A and a middle roof 1B.

As shown in FIG. 1A, the front roof 1A covers a top portion of the vehicle compartment 7, and the middle roof 1B is located continuously to the rear of the front roof 1A in the roof closed state.

In the roof closed state shown in FIG. 1A, FIG. 1B, and FIG. 2, a plate-like rear header 8, which is an element of the rear deck cover 3, is provided continuously to the rear of the middle roof 1B, and the rear window 9 is provided continuously below the rear header 8.

As shown in FIG. 1A, in the roof closed state, the front roof 1A, the middle roof 1B, the rear header 8 and the rear window 9 are in close contact with each other by a sealing member (not shown). By contrast, in the roof open state, the front roof 1A, the middle roof 1B, the rear header 8 and the rear window 9 are separated from each other as shown in FIG. 1B.

The front roof 1A, the middle roof 1B and the rear window 9 are coupled with each other by the roof open/close link mechanism (not shown; a plurality of links operable in association with each other), and are coupled with the vehicle body by the roof open/close link mechanism, on each of a left side and a right side in the vehicle width direction. The rear header 8 is not coupled with the roof open/close link mechanism and is provided as a part of the rear deck cover 3.

The roof chamber 2 (see FIG. 1A) is provided between the vehicle compartment 7 and the trunk 4 provided to the rear of the vehicle compartment 7. The roof chamber 2 is an area that accommodates the openable/closable roof 1 (the front roof 1A and the middle roof 1B) and the rear window 9. The front roof 1A, the middle roof 1B and the rear window 9 are accommodated in a stacking state in an up-down direction as represented by the dotted line in FIG. 1B.

The rear deck cover 3 covers an opening 2a (see FIG. 1A) of the roof chamber 2 and is displaced to open or close the opening 2a by the above-described link mechanism 6 (see FIG. 2).

The link mechanism 6 (see FIG. 2) is provided at each of both of two ends (left end and right end) in the vehicle width direction, of the roof chamber 2. The link mechanism 6 couples a bottom portion of the rear deck cover 3 and a side portion of the roof chamber 2 to each other, and supports a relatively front portion of the rear deck cover 3.

The openable/closable roof 1 in the roof closed state shown in FIG. 1A is accommodated in the roof chamber 2 in a folded state as shown in FIG. 1B as follows. First, the rear deck cover 3 is lifted up by the link mechanisms 6 (see FIG. 2). In the state where the rear deck cover 3 is lifted up, the front roof 1A, the middle roof 1B and the rear window 9 are folded in the up-down direction and accommodated into the roof chamber 2 (see FIG. 1B) by the roof open/close link mechanism (not shown). Next, the rear deck cover 3 is lifted down by the link mechanisms 6. As a result, as shown in FIG. 1B, the openable/closable roof 1 is accommodated in the roof chamber 2 and a top portion thereof is covered with the rear deck cover 3.

Now, with reference to FIG. 3 and FIG. 12, a structure of an area and the vicinity thereof, where an accessory attachment structure 10 is to be attached to the automobile including the above-described retractable roof will be described.

Figure 3:
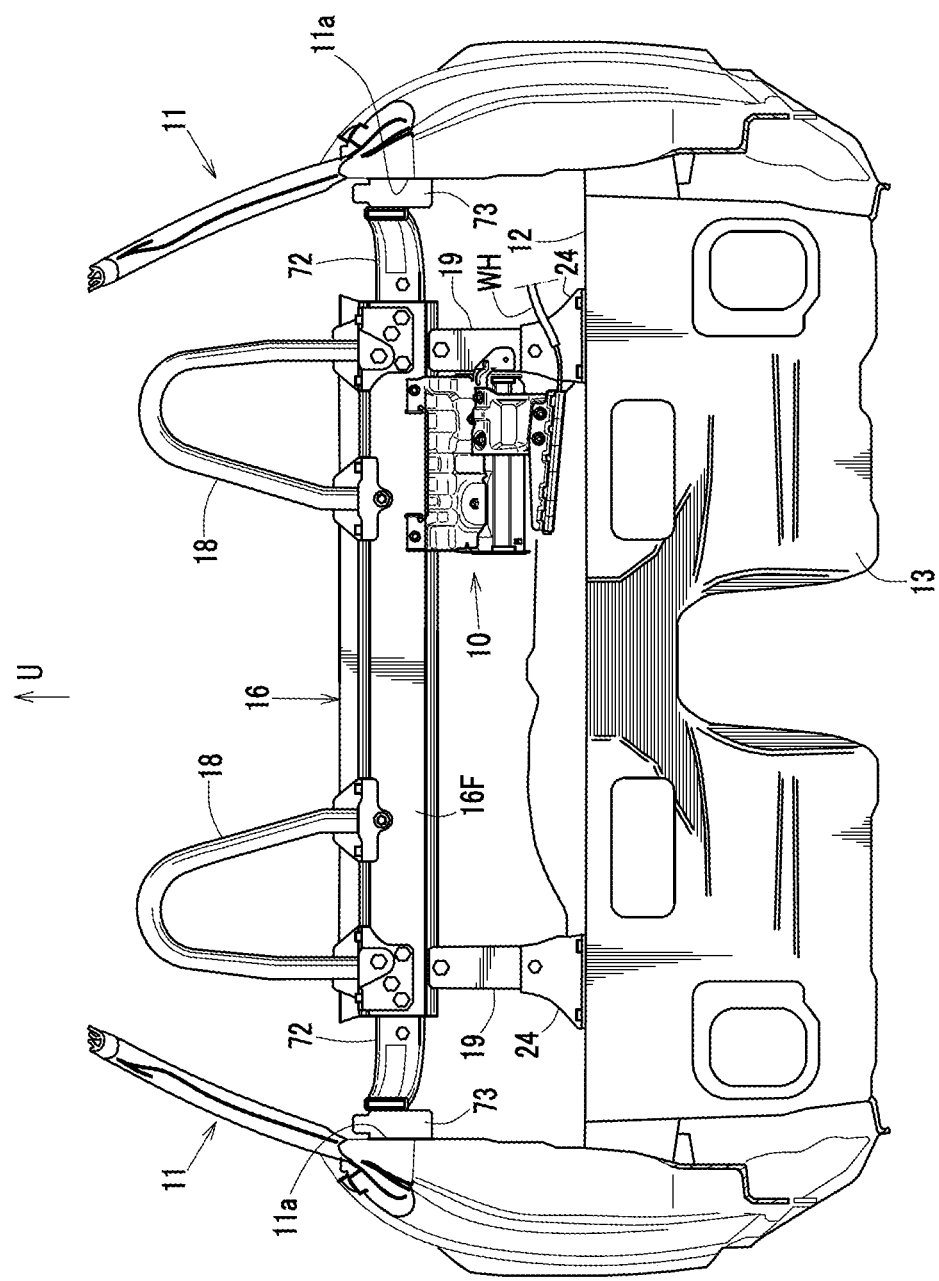
FIG. 3 is a cross-sectional view of a main part taken along line A-A in FIG. 2.
Figure 5:
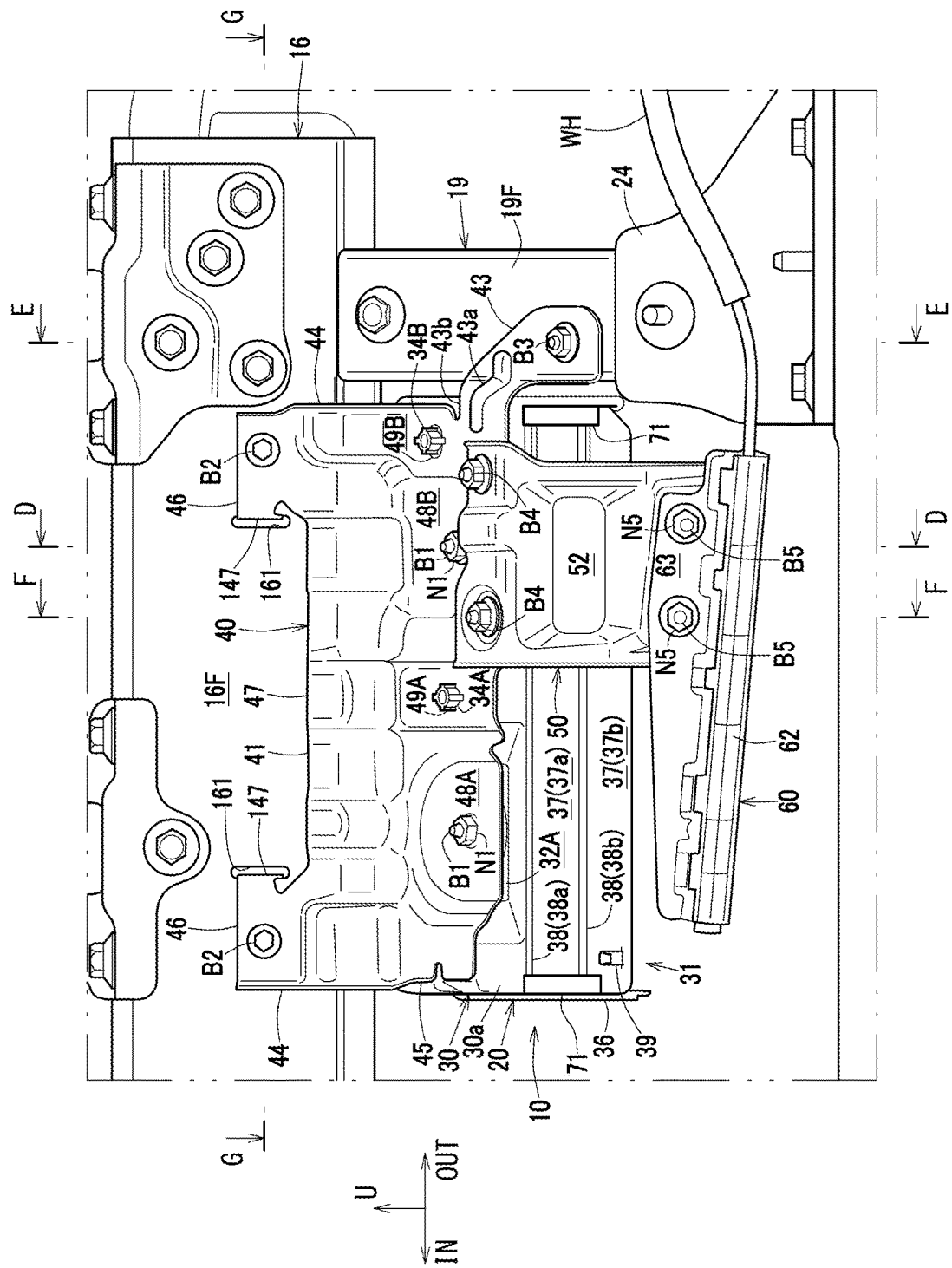
FIG. 5 is a front view of the accessory attachment structure.
Figure 12:
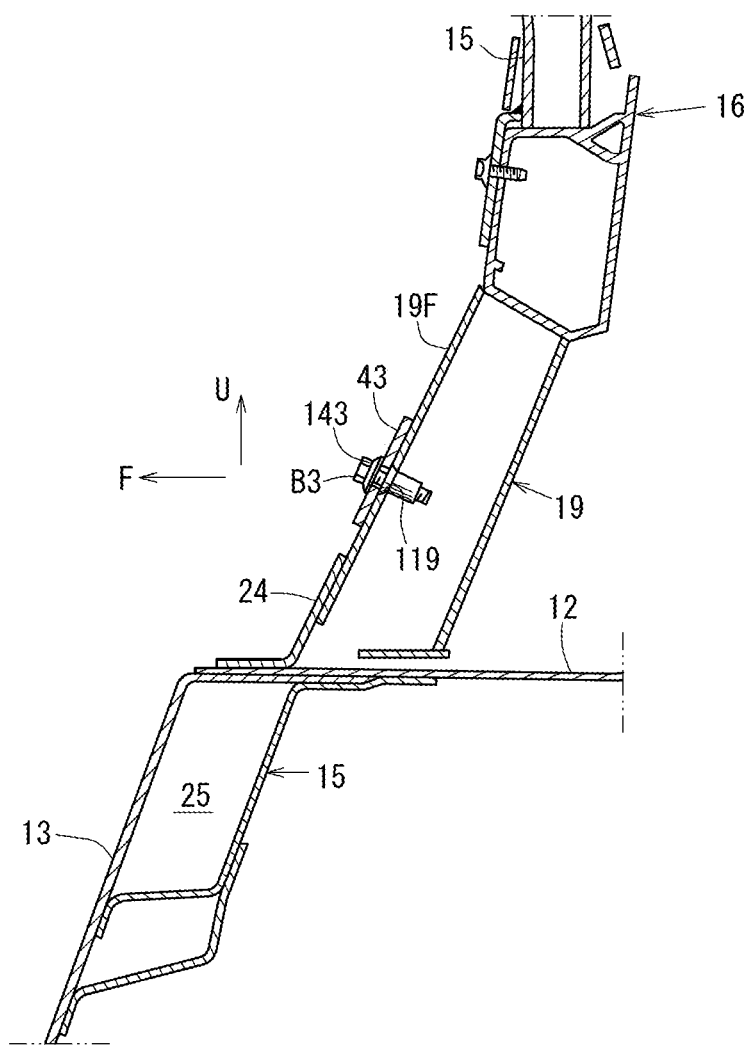
FIG. 12 is a cross-sectional view of a main part taken along line E-E in FIG. 5.

FIG. 3 is a cross-sectional view of a main part taken along line A-A in FIG. 2, and FIG. 12 is a cross-sectional view of a main part taken along line E-E in FIG. 5.

As shown in FIG. 3 and FIG. 12, a rear floor 12 is located between the vehicle compartment 7 and the roof chamber 2 in a vehicle front-rear direction. A front floor (not shown) is located continuously to a front portion of the rear floor 12 with a kick-up portion 13 being located between the front floor and the rear floor 12. A crossmember 15 (so-called No. 3 crossmember 15; see FIG. 12) extending in the vehicle width direction is attached between a rear surface of the kick-up portion 13 and a bottom surface of the front portion of the rear floor 12. The crossmember 15, the kick-up portion 13 and the rear floor 12 form a closed cross-section 25 extending in the vehicle width direction.

As shown in FIG. 3 and FIG. 12, a seatback crossmember 16 extending in the vehicle width direction is provided between the vehicle compartment 7 and the roof chamber 2 in the vehicle front-rear direction, so as to partition the vehicle compartment 7 and the roof chamber 2 from each other.

As shown in FIG. 3, the seatback crossmember 16 is provided with coupling brackets 72 at both of two ends thereof in the vehicle width direction. The coupling brackets 72 are each coupled with a center pillar inner member 11a via a base bracket 73 on each of both of two sides in the vehicle width direction. The base bracket 73 is a bracket that attaches a roof link (not shown) to the vehicle body.

As shown in FIG. 3 and FIG. 12, the seatback crossmember 16 is provided to extend in a lengthy manner in the vehicle width direction, at a position to the rear of seats in the vehicle. In this example, the seatback crossmember 16 is formed by extrusion molding of aluminum or an aluminum alloy to have a cross-sectional structure extending in the vehicle width direction.

The above-described seatback crossmember 16 is supported by a pair of, namely, left and right, legs 19 (support pillars). A front flange 24 having a bottom portion protruding forward is joined with a bottom portion of each of the legs 19. The front flange 24 is joined with the front portion of the rear floor 12, which forms a top surface of the crossmember 15 (see FIG. 3 and FIG. 12).

The seatback bars 18 (a pair of, namely, left and right, seatback bars 18) are provided respectively in correspondence with a position to the rear of the driver's seat and a position to the rear of the passenger seat of the vehicle. The seatback bars 18 are provided above the seatback crossmember 16 to protrude in an inverted U shape as seen in a front view.

As shown in FIG. 3 through FIG. 11 and FIG. 13, the accessory attachment structure 10 attaching an accessory 20 to the seatback crossmember 16 is located at one of corners formed by the seatback crossmember 16 and the left leg 19. The corner at which the accessory attachment structure 10 is located is inner, among the above-mentioned corners, in the vehicle width direction and faces the right leg 19.

The accessory 20 is attached, to the seatback crossmember 19 via the accessory attachment structure 10, in an area between the vehicle compartment 7 and the roof chamber 2. In the state where the openable/closable roof 1 is open, this area is opened upward and thus becomes a water-coverable area.

In this example, the accessory 20 is a power control device, more specifically, an inverter that converts electric power supplied from a battery separately provided (not shown) into a power value suitable to drive a motor (not shown) usable to drive the link mechanisms for the rear deck cover 3 and a motor (not shown) usable to drive the link mechanism for the openable/closable roof 1.

Figure 4:
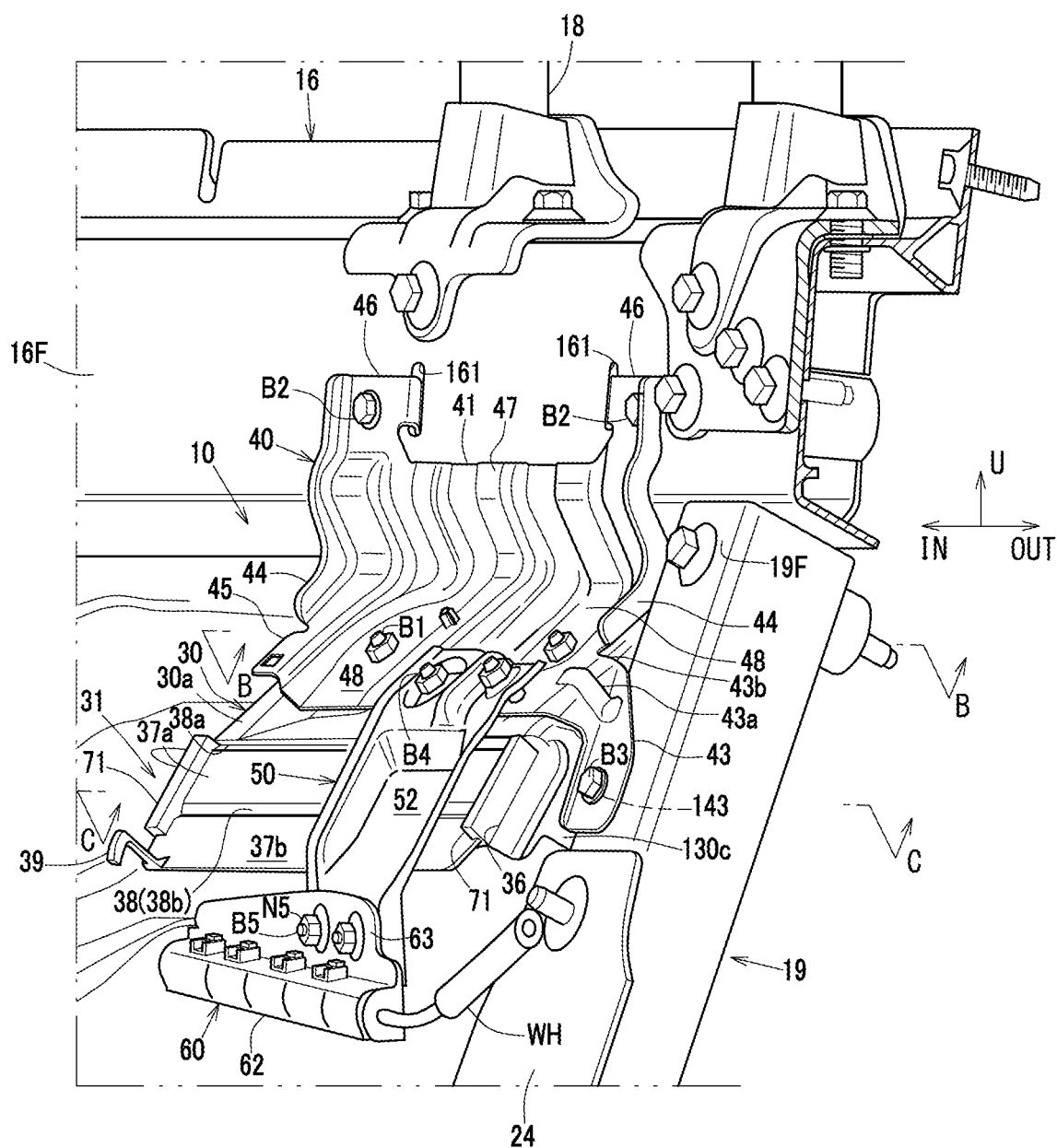
FIG. 4 is a partially cross-sectional external appearance view of the accessory attachment structure.
Figure 6:
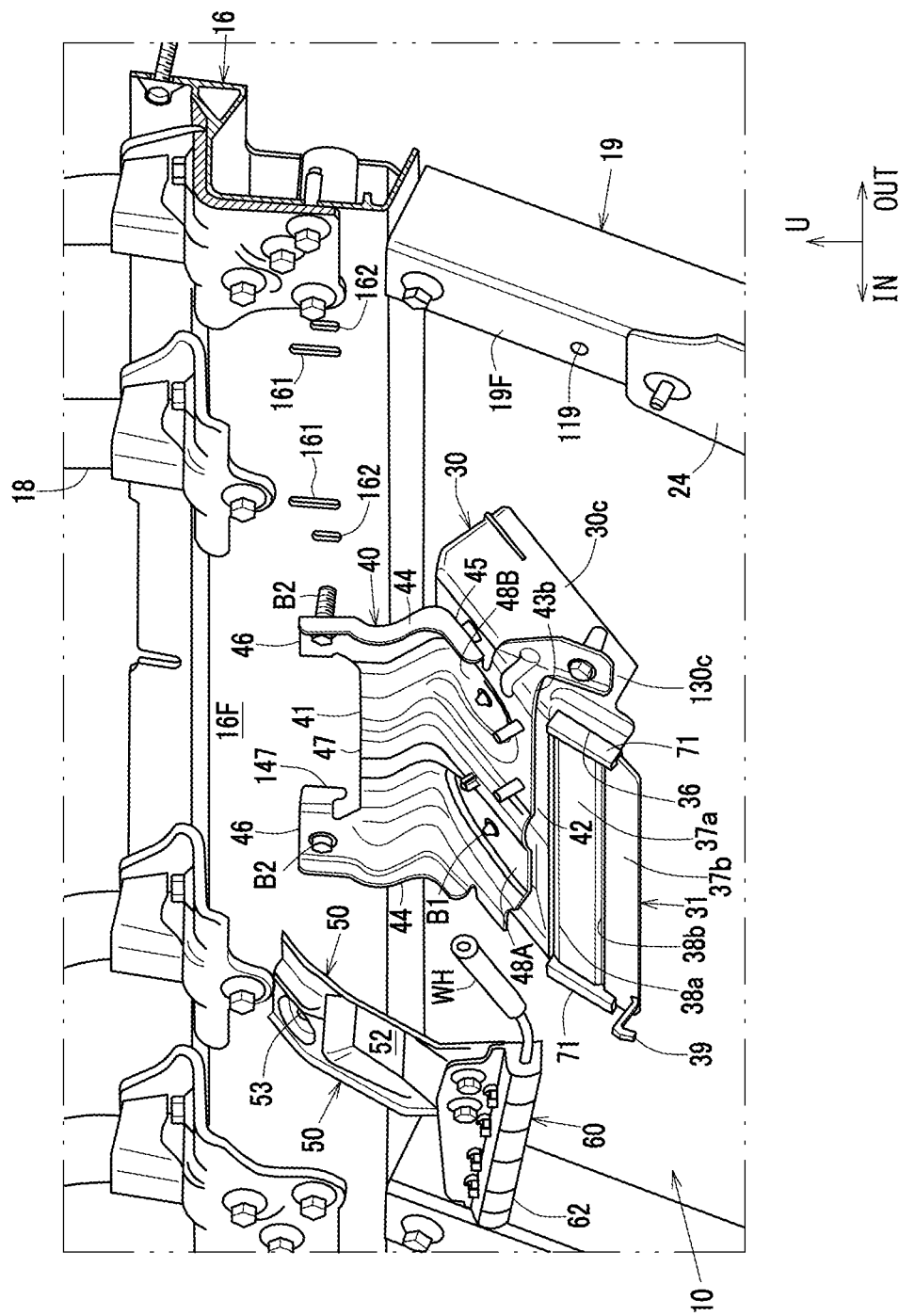
FIG. 6 is a partially cross-sectional exploded isometric view of the accessory attachment structure.
Figure 7:
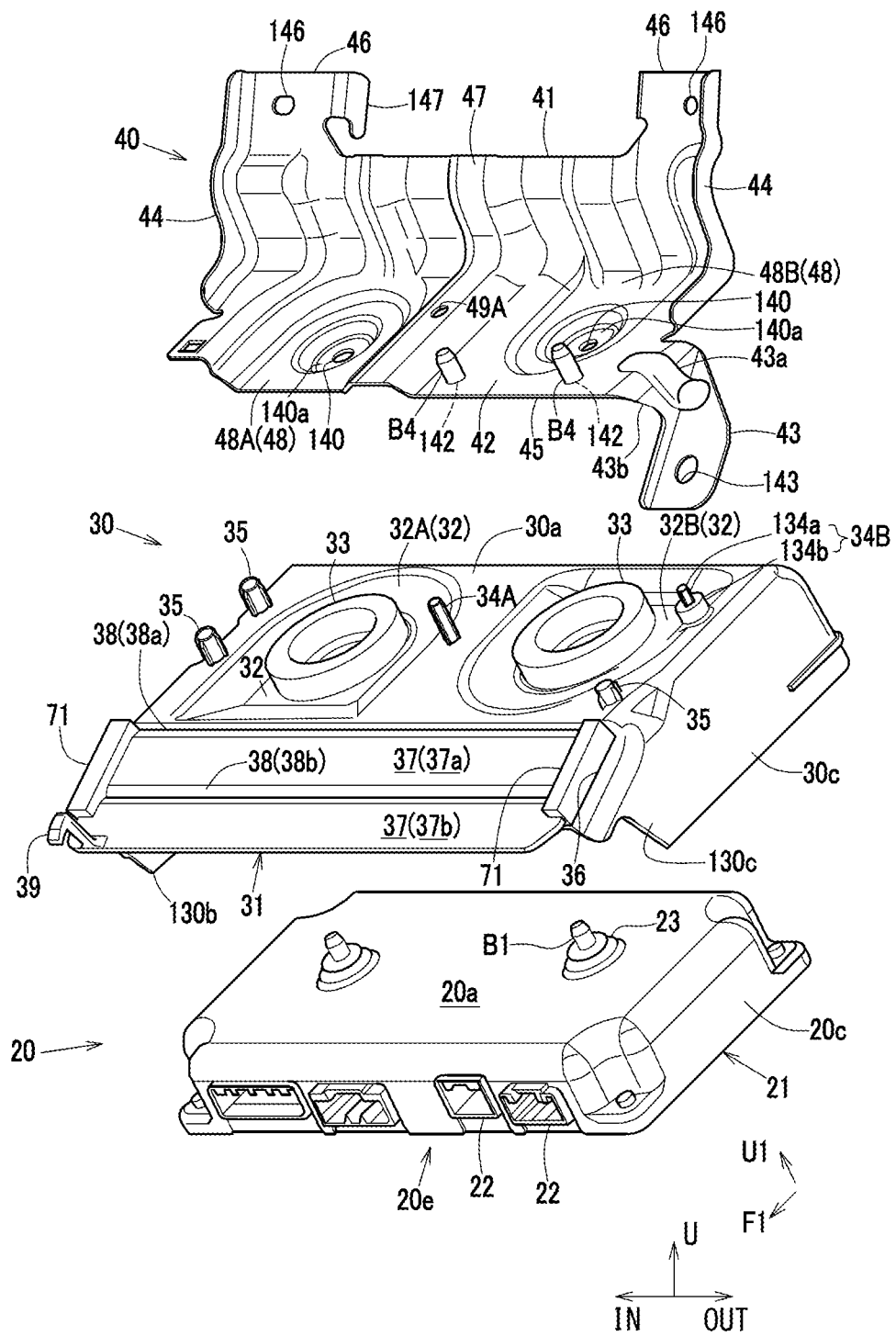
FIG. 7 is a isometric view of an accessory, a cover and an accessory attachment bracket as seen obliquely from the front and above.
Figure 8:
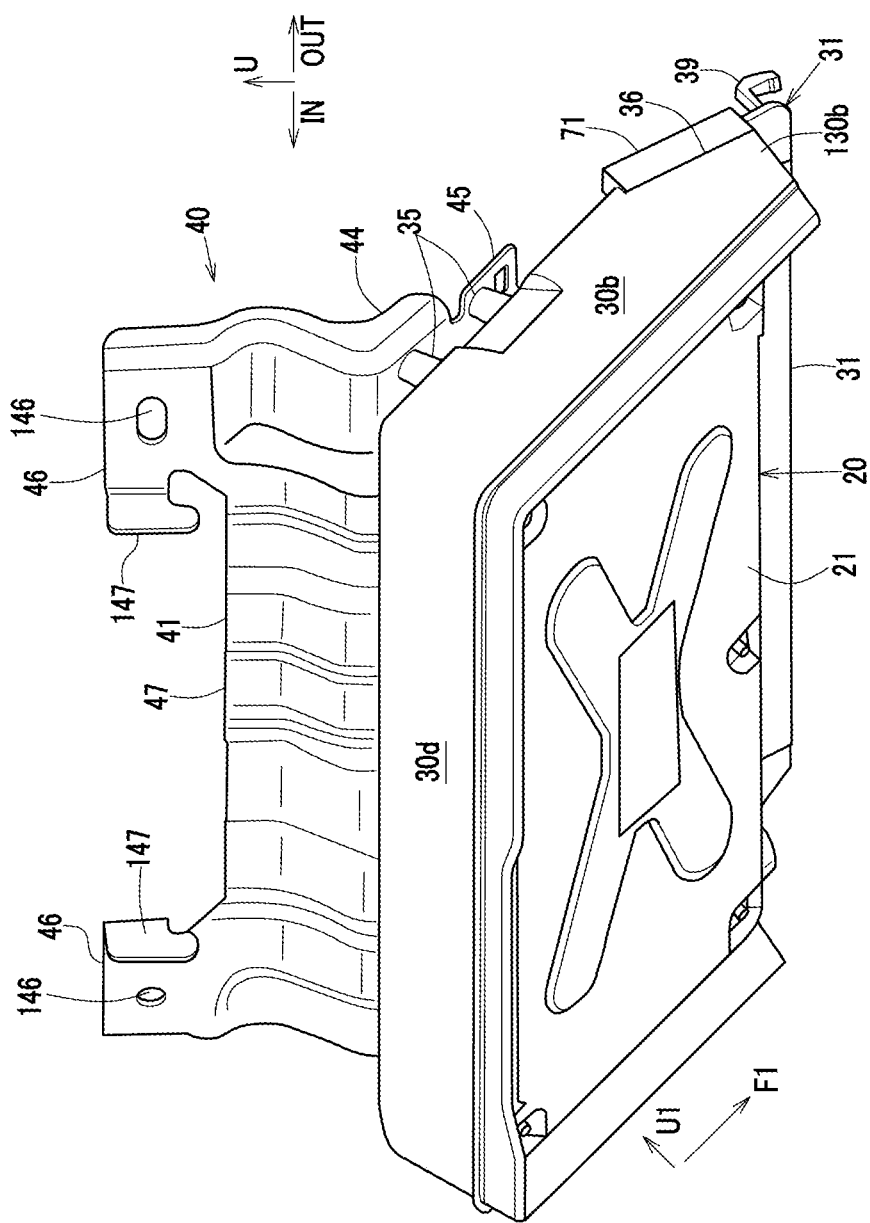
FIG. 8 is a isometric view of the accessory, the cover and the accessory attachment bracket as seen obliquely from the rear and below.
Figure 9:
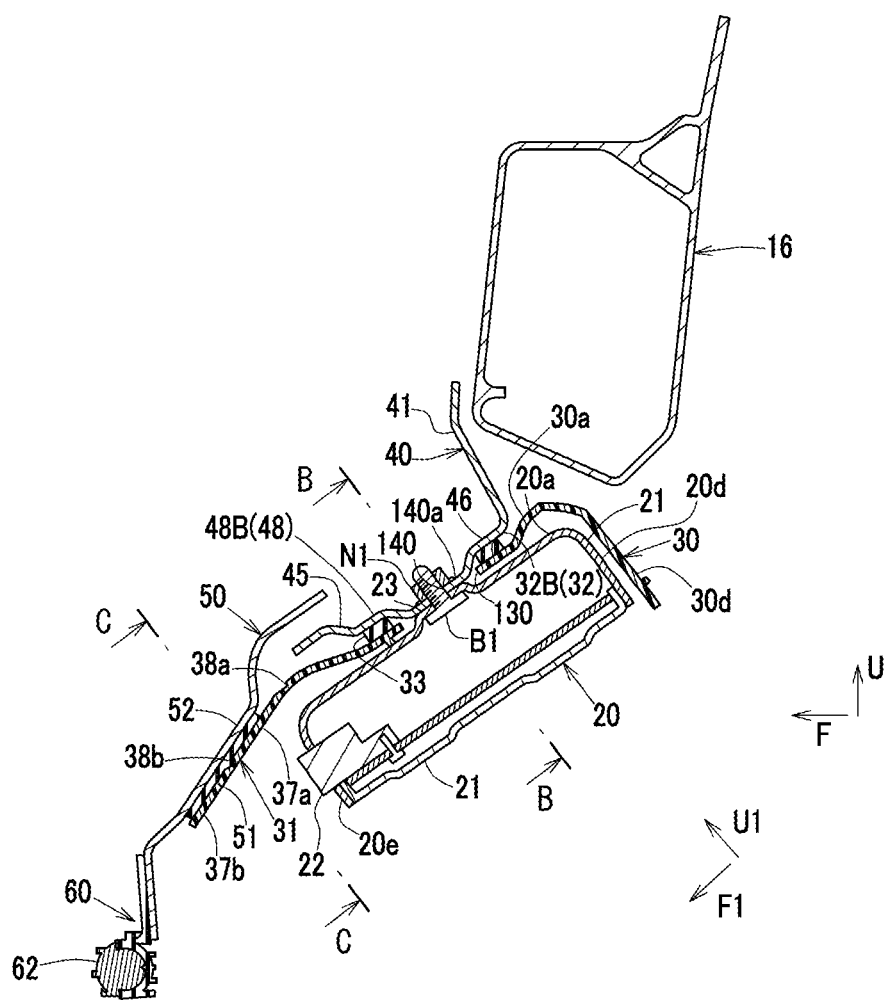
FIG. 9 is a cross-sectional view of a main part taken along line D-D in FIG. 5.
Figure 10:
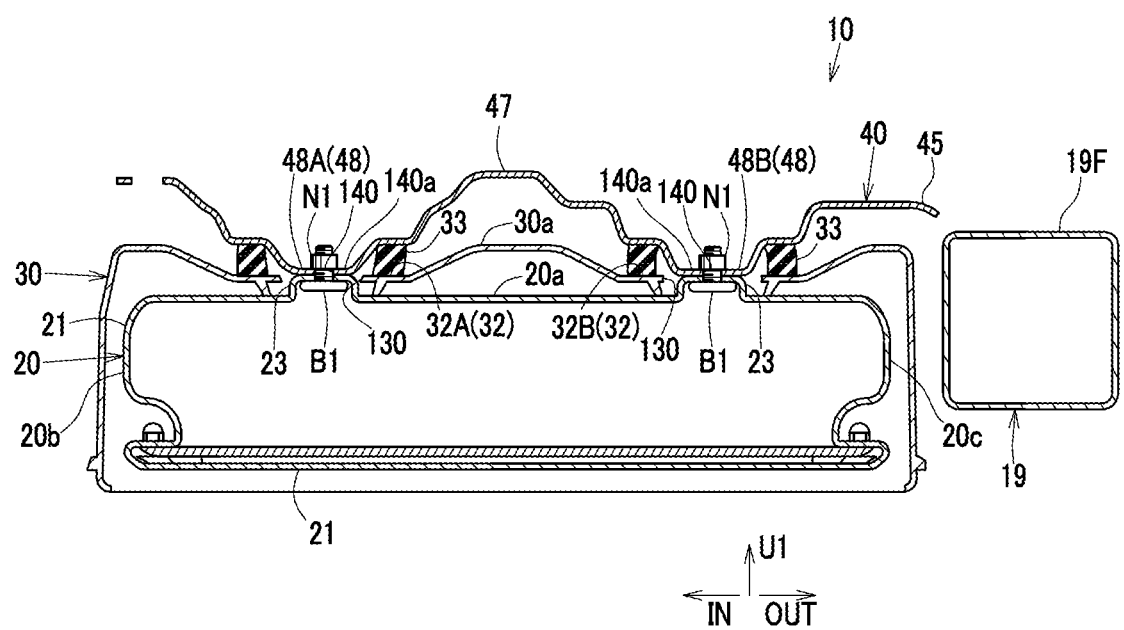
FIG. 10 is a cross-sectional view of a main part taken along line B-B in FIG. 4.
Figure 11:
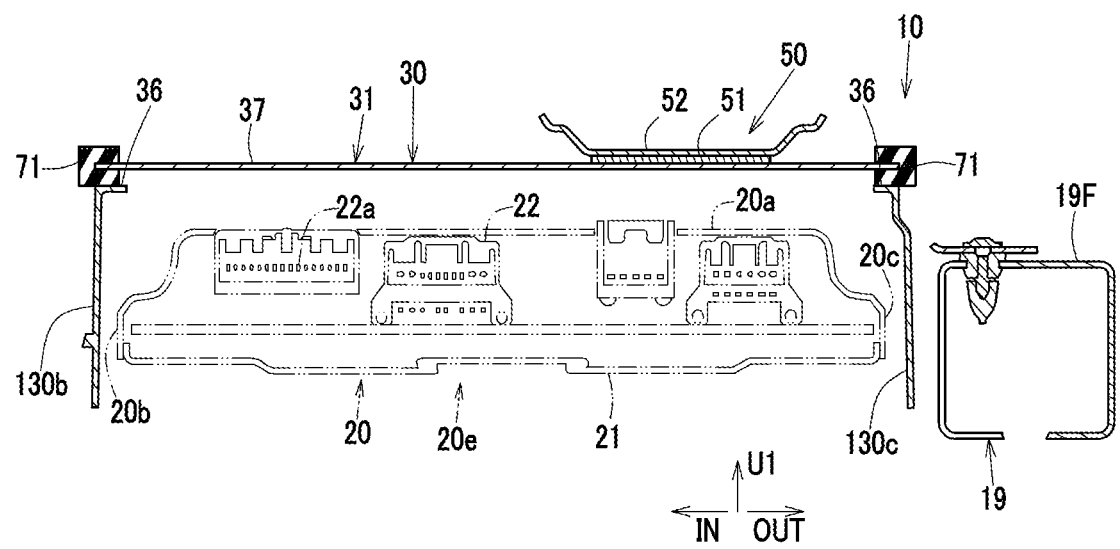
FIG. 11 is a cross-sectional view of a main part taken along line C-C in FIG. 4.
Figure 13A:
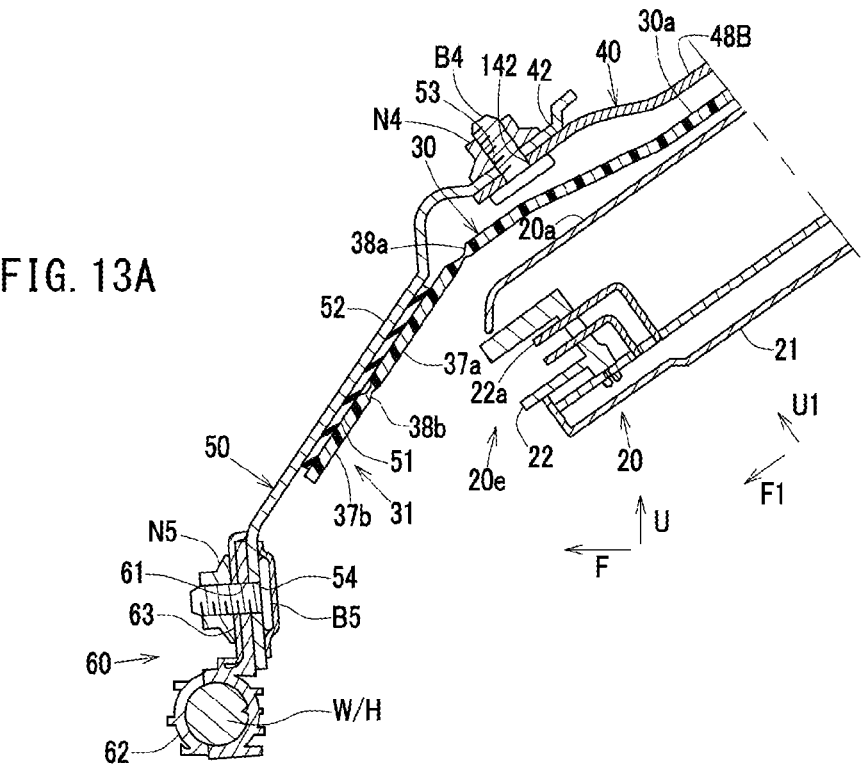
FIGS. 13A and 13B provide a cross-sectional view of a main part taken along line F-F in FIG. 5 and a cross-sectional view of a main part taken along line G-G in FIG. 5.
Figure 13B:
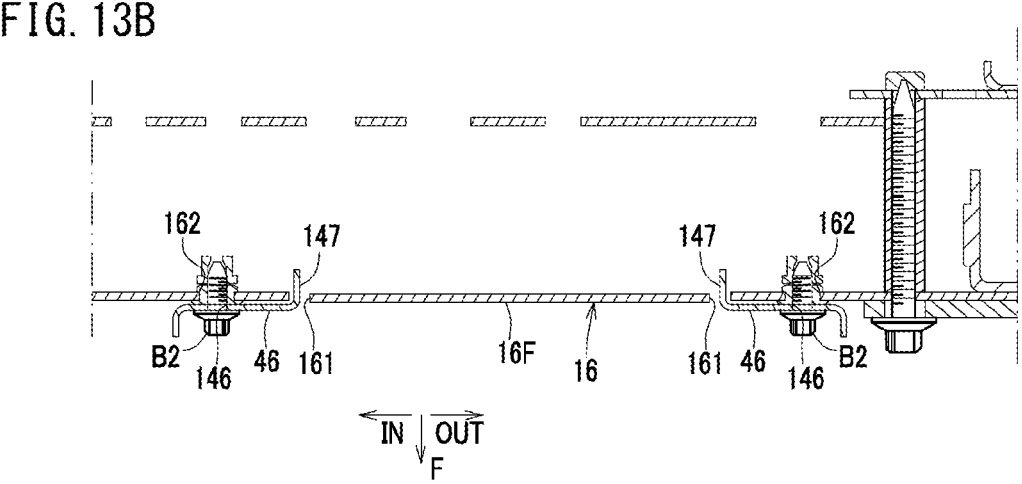

FIG. 4 is an isometric view of a cross-section of the automobile accessory attachment structure taken along line A-A in FIG. 2 as seen from the outer side in the vehicle width direction. FIG. 5 is a front view of the accessory attachment structure. FIG. 6 is a partially cross-sectional exploded isometric view of the accessory attachment structure. FIG. 7 is an isometric view of the accessory, a cover and an accessory attachment bracket in a separate state as seen obliquely from the front and above. FIG. 8 is an isometric view of the accessory and the accessory attachment structure from which a harness supporting bracket is removed, as seen from the rear and below. FIG. 9 is a cross-sectional view of a main part taken along line D-D in FIG. 5. FIG. 10 is a cross-sectional view of a main part taken along line B-B in FIG. 4 and FIG. 9. FIG. 11 is a cross-sectional view of a main part taken along line C-C in FIG. 4 and FIG. 9. FIG. 13(a) is a cross-sectional view of a main part taken along line F-F in FIG. 5. FIG. 13(b) is a cross-sectional view of a main part taken along line G-G in FIG. 5. FIG. 5 omits the coupling brackets 72.

As shown in FIG. 4 and FIG. 9, the accessory 20 is attached, in a posture inclining forward, to the seatback crossmember 16 by the accessory attachment structure 10. In FIG. 9, arrow F1 represents the forward direction for the accessory attachment structure 10, and arrow U1 represents the upward direction for the accessory attachment structure 10.

As shown in FIG. 7 through FIG. 11, the accessory 20 has a generally parallelepiped rectangular shape that is shorter in the thickness direction than in the vehicle width direction and in the front-rear direction, and is substantially entirety housed in a metal housing 21 as an outer casing. A front portion 20e of the accessory 20 has a plurality of female connectors 22 (connector connection openings) formed therein. A plurality of connection terminals 22a are provided in each of the female connectors 22. The female connectors 22 provided in the front portion 20e of the accessory 20 are electrically connected with male connectors (not shown), connected to tips closer to a wire harness (WH), via appropriate connection cables or the like (not shown).

As shown in FIG. 7, FIG. 9 and FIG. 10, bosses 23 protruding upward in a stepped manner are formed on the top portion 20a of the accessory 20, at a position intermediate in the front-rear direction and on the left side and the right side in the vehicle width direction. A bolt B1 protrudes upward at a center of a flat top surface of each of the bosses 23.

As shown in FIG. 4 through FIG. 11, the accessory attachment structure 10 includes the bolts B1 provided on the accessory 20, the cover 30, and the accessory attachment bracket 40, the harness supporting bracket 50, and a harness holding member 60.

As shown in FIG. 4 through FIG. 10, the accessory attachment bracket 40 is generally L-shaped as seen in a side view. The accessory attachment bracket 40 includes an extending portion 41 (see FIG. 9) extending rearward and downward from a bottom portion of a front portion 16F of the seatback crossmember 16, and an accessory attachment bracket main body 45 extending forward and downward from a rear bottom end of the extending portion 41 and attached to a top surface of the accessory 20. The extending portion 41 and the accessory attachment bracket main body 45 are integrally formed of a metal material. The metal material is steel in this example, but may be any general metal material such as stainless steel, aluminum, an aluminum alloy or the like.

As shown in FIG. 4 through FIG. 8, a pair of bar attachment pieces 46 protruding upward are formed at positions that are above the extending portion 41 and on both of two sides in the vehicle width direction. As shown in FIG. 7 and FIG. 8, the pair of bar attachment pieces 46 respectively have attachment holes 146 formed therein that are usable to attach the accessory attachment bracket 40 to the front portion 16F of the seatback crossmember 16.

The attachment hole in one of the pair of bar attachment pieces 46 that is inner in the vehicle width direction is elliptical and longer in the vehicle width direction (see FIG. 7).

As shown in FIG. 5 through FIG. 8 and FIG. 13B, locking protruding pieces 147 are provided at inner edges of the pair of (left and right) bar attachment pieces 46 in the vehicle width direction. The locking protruding pieces 147 are insertable into locking holes 161 (described below, see FIG. 4 and FIG. 6), formed in the front portion 16F of the seatback crossmember 16, to be locked at edges of the locking holes 161.

As shown in FIG. 6 and FIG. 13B, the front portion 16F of the seatback crossmember 16 has attachment holes 162, usable to attach the accessory attachment bracket 40, formed therein. The attachment holes 162 are longer in the up-down direction, and are formed at positions corresponding to the attachment holes 146 formed in the bar attachment pieces 46 in the state where the accessory attachment bracket 40 is attached.

As shown in FIG. 4 through FIG. 6 and FIG. 13B, the front portion 16F of the seatback crossmember 16 has the locking holes 161 formed to run therethrough. The locking holes 161 are longer in the up-down direction, and are formed at positions corresponding to the locking protruding pieces 147 formed on the bar attachment pieces 46 in the state where the accessory attachment bracket 40 is attached.

The attachment holes 146 formed in the bar attachment pieces 46 and the attachment holes 162 formed in the front portion 16F of the seatback crossmember 16 are secured to each other by attachment members such as bolts B2 or the like (see FIG. 13B). In the state where the pair of attachment pieces 46 are attached to the front portion 16F of the seatback crossmember 16, the extending portion 41 extends rearward and downward from the bottom portion of the front portion 16F of the seatback crossmember 16 as described above (see FIG. 9).

As shown in FIG. 4 through FIG. 7, the accessory attachment structure 10 has a recessed and protruding shape, namely, includes a plurality of recessed portions and a plurality of protruding portions extending in the vehicle width direction and located alternately. Among the plurality of protruding portions, a protruding portion 47 formed at a center in the vehicle width direction, continuously extends from a top end of the extending portion 41 to a front end of the accessory attachment bracket main body 45.

As shown in FIG. 4 through FIG. 7, recessed portions 48 recessed with respect to the vicinity thereof are formed on both of two sides of the protruding portion 47 at the center in the vehicle width direction of the accessory attachment bracket main body 45. As shown in FIG. 7, FIG. 9 and FIG. 10, an attachment hole 140 is formed at a center of each of the pair of recessed portions 48 of the accessory attachment bracket 40. The attachment hole 140 is usable to attach the accessory attachment bracket 40 to the cover 30. A recessed perimeter 140a is formed around each of the attachment holes 140 formed in the recessed portions 48, and is further recessed as compared with the recessed portion 48 (see FIG. 7).

As shown in FIG. 6 and FIG. 7, among the pair of recessed portions 48, the recessed portion 48A inner in the vehicle width direction extends rearward (toward the extending portion) from the front end of the accessory attachment bracket main body 45 while keeping substantially the same width. In a rear portion thereof, the recessed portion 48A has the width gradually decreased rearward (toward the extending portion) and protrudes in a semi-arc shape as seen in a plan view.

Among the pair of recessed portions 48, the recessed portion 48 outer in the vehicle width direction extends forward from a rear end of the accessory attachment bracket main body 45 (border with the extending portion) while keeping substantially the same width. In a front portion thereof, the recessed portion 48 has the width gradually decreased forward and protrudes in a semi-arc shape as seen in a plan view.

Namely, as shown in FIG. 6, FIG. 7 and FIG. 13A, the accessory attachment bracket main body 45 does not have any recessed portion 48 in a front portion on the outer side in the vehicle width direction. A portion to the front of the recessed portion 48 is raised as compared with the recessed portion 48 formed on the outer side in the vehicle width direction, and forms a flat attachment surface 42, to which the harness supporting bracket 50 is attachable. On both of two sides of the attachment surface 42, attachment holes 142 usable to attach the harness supporting bracket 50 are formed (see FIG. 13A).

As shown in FIG. 4, FIG. 6, FIG. 7 and FIG. 12, a leg attachment piece 43 is formed, via a coupling portion 43b, at a front portion of an outer edge, in the vehicle width direction, of the accessory attachment bracket main body 45. The leg attachment piece 43 extends outward in the vehicle width direction from the front portion of the outer edge and is attachable to the right leg as seen in a front view.

As shown in FIG. 7, the leg attachment piece 43 is formed to be inclined from the accessory attachment bracket main body 45 such that a front portion thereof is lower than a rear portion thereof. The leg attachment piece 43 is inclined in correspondence with an inclination angle of a front portion 19F of the left leg 19 so as to contact the front portion 19F. The leg attachment piece 43 has an attachment hole 143 formed therein. The attachment hole 143 is usable to attach the leg 19. A reinforcement rib 43b is formed in an area between an end of the coupling portion 43b connected with the accessory attachment bracket main body 45 and a base end of the leg attachment piece 43. The rib 43b extends in this area continuously in a direction in which the coupling portion 43b extends (see FIG. 5 and FIG. 7).

The front portion 19F of the leg 19 has an attachment hole 119 formed therein. The attachment hole 119 is formed at a position corresponding to the attachment hole 143 in the leg attachment piece 43 (see FIG. 6 and FIG. 12). As shown in FIG. 4 and FIG. 12, the attachment hole 143 formed in the leg attachment piece 43 and the attachment hole 119 formed in the front portion 19F of the leg 19 are secured to each other by an attachment member such as a bolt B3 or the like.

As shown in FIG. 4 through FIG. 8, the above-described accessory attachment bracket 40 are provided with rising pieces 44 rising upward. The rising pieces 44 are provided along the both of two ends of the accessory attachment bracket 40 from top ends of the bar attachment pieces 46 except for front bottom portions thereof.

As shown in FIG. 5 and FIG. 7, the accessory attachment bracket main body 45 has positioning holes 49A and 49B formed therein. The positioning hole 49A is formed at an intermediate position in the vehicle width direction and the front-rear direction, and the positioning hole 49B is formed at a position that is intermediate in the front-rear direction and on the outer side in the vehicle width direction. The positioning holes 49A and 49B are usable to position the accessory attachment bracket main body 45 with respect to the cover 30. The positioning hole 49B on the outer side of the accessory attachment bracket main body 45 in the vehicle width direction is longer in the vehicle width direction such that the accessory attachment bracket main body 45 is positioned only in the front-rear direction.

As shown in FIG. 7, FIG. 9 through FIG. 11 and FIG. 13(a), the above-described cover 30 is formed of a resin (in this example, formed of polypropylene). The cover 30 includes a top portion 30a, a vehicle width direction inner portion 30b, a vehicle width direction outer portion 30c and a rear portion 30d respectively covering a top portion 20a, a vehicle width direction inner portion 20b, a vehicle width direction outer portion 20c and a rear portion 20d of the accessory 20. As shown in FIG. 4 through FIG. 9, FIG. 12 and FIG. 13A, the cover 30 includes a cover front top portion 31 extending to protrude forward and downward from a front end of the top portion 30a. The cover 30 is formed integrally.

As shown in FIG. 5, FIG. 7 and FIG. 9, the top portion 30a of the cover 30 has recessed portions 32 (32A, 32B) at both of two sides in the vehicle width direction. The pair of recessed portions 32 are shaped in correspondence with the recessed portions 48 (48A, 48B) in the accessory attachment bracket main body 45 as seen in a plan view, in the state where the accessory attachment bracket main body 45 is attached to the top portion 20a.

As shown in FIG. 9 and FIG. 10, the cover 30 has a through-hole 130 formed therein at a center of each of the pair of, namely, left and right, recessed portions 32. The through-hole 130 has such a diameter as to allow the recessed perimeter 140a of the accessory attachment bracket 40 and the boss 23 of the accessory 20 to contact each other in the state where the cover 30 is held between the accessory attachment bracket 40 above the cover 30 and the accessory 20 below the cover 30. As shown in FIG. 7, FIG. 9 and FIG. 10, a circular ring-shaped rubber member 33 (collar) elastically deformable in a thickness direction is provided along an outer perimeter of each of the attachment holes 130 in the recessed portions 32.

As shown in FIG. 5 and FIG. 7, positioning pins 34A and 34B are formed to protrude upward on the cover 30. The positioning pin 34A is located at an intermediate position in the vehicle width direction and the front-rear direction, and the positioning pin 34B is located at a position that is intermediate in the front-rear direction and on the outer side in the vehicle width direction. The positioning pins 34A and 34B are usable to position the accessory attachment bracket main body 45. Among the positioning pins 34A and 34B, the positioning pin 34B formed on the outer side in the vehicle width direction of the top portion 30a of the cover 30 is formed as a stepped pin (see FIG. 7). A bottom portion of the positioning pin 34B acts as a spacer 134b, and a top portion thereof acts as a positioning pin 134a. Spacer members 35 are formed to protrude upward at three positions on the top portion 30a, more specifically, at an intermediate position and a rear position in the front-rear direction on the inner side in the vehicle width direction, and at a front position in the front-rear direction on the outer side in the vehicle width direction. The spacer members 35 protrude by the same amount as that of the bosses 23 (see FIG. 7).

As shown in FIG. 7 and FIG. 11, the vehicle width direction inner portion 30b and the vehicle width direction outer portion 30c of the cover 30 extend to a position to the front of the top portion 30a. Top ends of such extending portions 130b and 130c extend, like edges, forward and downward. As a result, such top ends form support portions 36 having a posture protruding forward and downward (inclining more steeply than the top portion 30a such that a front portion thereof is lower than a rear portion thereof) from the front end of the top portion 30a and supporting the cover front top portion 31 from below.

As shown in FIG. 6 and FIG. 7, the supporting portions 36 support the cover front top portion 31 at both of two sides in the vehicle width direction, more specifically, support a portion of the cover front top portion 31 between a base end in the front-rear direction and a position to the front of, and below, an intermediate hinge 38b described below.

As shown in FIG. 4 through FIG. 7, the cover front top portion 31 is formed to extend forward from substantially the entirety of the front end of the top portion 30a, and includes a plurality of (two in this example) panels 37 and a plurality of (two in this example) hinges 38 arrayed alternately in the extending direction.

The panels 37 include a rear panel 37a located in a rear portion (closer to the base end) of the cover front top portion 31 and a front panel 37b located in a front portion (closer to a tip end) of the cover front top portion 31. These two panels 37a and 37b are of a strip-shape extending in the vehicle width direction while having such a thickness as to guarantee the shape retainability (rigidity) by which the shape thereof is retained against the weight thereof (see FIG. 4 through FIG. 7).

As shown in FIG. 4 through FIG. 8, a bracket engaging piece 39 is formed at a front end on the inner side in the vehicle width direction of the front panel 37b. The bracket engaging piece 39 protrudes upward and has a tip thereof bent forward to be engageable with the accessory attachment bracket 40.

As shown in FIG. 4 through FIG. 7, the hinges 38 include a base end hinge 38a and the intermediate hinge 38b, and are thinner than the panels 37 in the entirety of the vehicle width direction such that the cover front top portion 31 is bendable (foldable).

The base end hinge 38a is formed at a position corresponding to an area between the front panel 37b and the top portion 30a, namely, at a base end of the cover front top portion 31 in the protruding direction. The intermediate hinge 38b is formed at a position corresponding to an area between the rear panel 37a and the front panel 37b, namely, at an intermediate position of the cover front top portion 31 in the protruding direction.

As shown in FIG. 4 through FIG. 8 and FIG. 11, seal members 71 formed of an elastic material such as urethane or the like are attached to both of two ends in the vehicle width direction of the cover front top portion 31. The seal members 71 are formed from the base end to a front position of the cover front top portion 31. The seal members 71 have a substantially C-shaped cross-section and are fit into ends on the two sides in the vehicle width direction of the cover front top portion 31. As a result, the panels 37 and also the hinges 38 are pressed into the elastic seal members 71, and thus the sealability between a bottom surface of the cover front top portion 31 and a top surface of the support members 36 is guaranteed.

The cover front top portion 31 is supported by the support members 36 at both of two ends in the vehicle width direction so as not to be hung by the weight thereof. As a result, the cover front top portion 31 protrudes, in an eaves-like posture, forward and downward from the front end of the top portion 30a, and thus covers at least the front portion 20e of the accessory 20 at a position to the front of, and above, the front portion 20e. The front portion 20e has the female connectors 22 formed therein.

Figure 14:
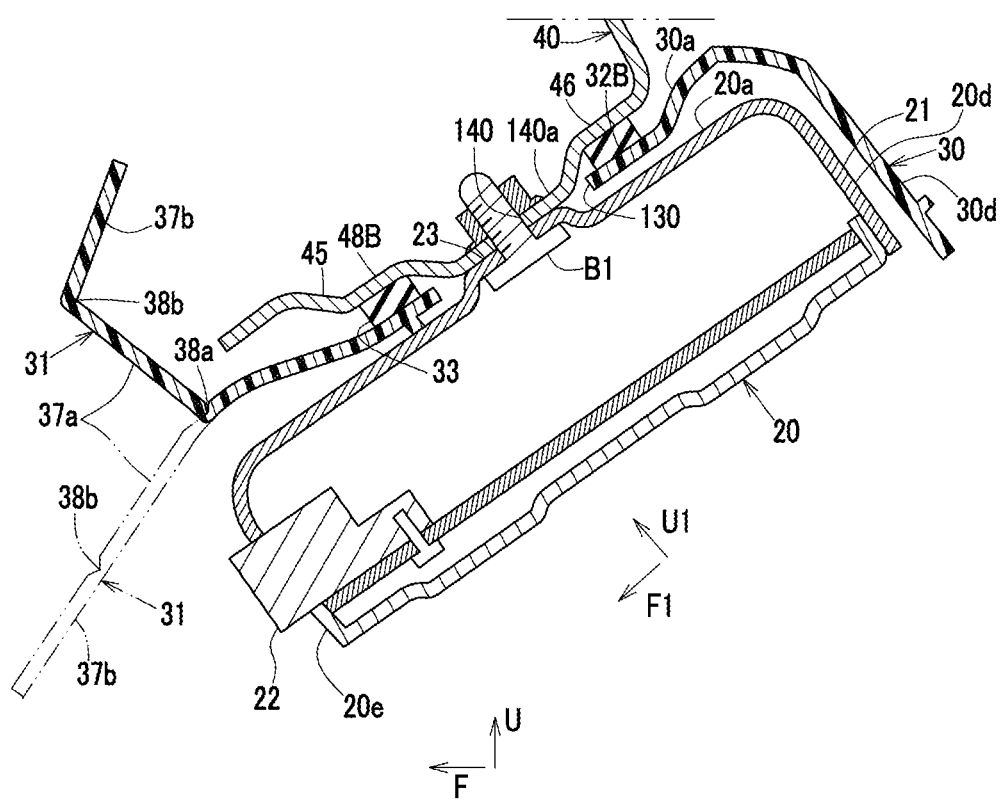
FIG. 14 is a cross-sectional view of a main part showing the state where a cover front top portion shown in FIG. 9 is rolled up.

FIG. 14 shows a state where the harness supporting bracket 50 described below is detached. As shown in FIG. 14, the cover front top portion 31 may be rolled up while being bent at the hinges 38 (38a, 38b) and thus expose the female connectors 22 formed in the front portion 20e of the accessory 20 from the state of being covered with the cover front top portion 31.

FIG. 14 is a cross-sectional view of a main part showing a state where the harness supporting bracket is detached and the cover front top portion 31 shown in FIG. 9 is rolled up.

The above-described accessory attachment structure 10 is assembled as follows. The cover 30 is held between the accessory attachment bracket main body 45 of the accessory attachment bracket 40 above the cover 30 and the accessory below the cover 30 (see FIG. 7, FIG. 9 and FIG. 10). In the state where the recessed perimeters 140a of the accessory attachment bracket 40 and the bosses 23 of the accessory 20 are in contact with each other, the bolts B1 inserted into the attachment holes 140 of the accessory attachment bracket 40 are tightened with nuts N1, so that the accessory 20 and the bracket 40 are assembled together with the cover 30 being located between the accessory 20 and the accessory attachment bracket 40 (see FIG. 5, FIG. 9 and FIG. 10). With such an arrangement, the accessory 20 is supported with a higher rigidity as compared with the case where the cover 30 is held between the recessed perimeters 140a of the accessory attachment bracket main body 45 and the bosses 23 of the accessory 20, which are both formed of a metal material. In addition, heat above the accessory 20 is easily transmitted to the accessory attachment bracket main body 45, and thus the heat dissipation of the area above the accessory 20 is improved.

The circular ring-shaped rubber members 33 in a deformed state by being compressed are located between the accessory attachment bracket 40 and the cover 30 for the purpose of moisture prevention and damping.

As shown in FIG. 13A, the above-described harness supporting bracket 50 has attachment holes 53 formed in a rear portion (base portion) thereof. The attachment holes 53 are usable to attach the harness supporting bracket 50 to the accessory attachment bracket main body 45. The attachment holes 142 formed in the attachment surface 42 of the accessory attachment bracket main body 45, and the attachment holes 53 formed in the harness supporting bracket 50, are tightened and thus secured to each other by tightening members such as, for example, bolts B4 and nuts N4.

The harness supporting bracket 50 is formed, in the state of being attached to the attachment surface 42 of the accessory attachment bracket main body 45, to be located above the cover front top portion 31 and to protrude forward and downward by a length greater than the protruding length of the cover front top portion 31 (see FIG. 4, FIG. 5, FIG. 9, FIG. 11 and FIG. 13A).

As shown in FIG. 4, FIG. 5 and FIG. 11, the harness supporting bracket 50 is located above an outer portion, in the vehicle width direction, of the cover front top portion 31 in the forward inclining posture. As shown in FIG. 11 and FIG. 13A, the harness supporting bracket 50 includes a guide press 52 in a portion thereof bridging the intermediate hinge 38b in the protruding direction of the cover front top portion 31. The guide press 52 guides the cover front top portion 31 such that the cover front top portion 31 is not foldable. Namely, the guide press 52 contacts the cover front top portion 31 from above with a rubber sheet being located between the guide press 52 and the cover front top portion 31, such that the cover front top portion 31 is not rolled up inadvertently.

As shown in FIG. 13A, attachment holes 54 are formed on both of two sides, in the vehicle width direction, of a front portion (tip portion) of the harness supporting bracket 50, namely, of a portion of the harness supporting bracket 50 that protrudes forward and downward from the cover front top portion 31. The attachment holes 54 are usable to attach the harness holding member 60, which supports the wire harness (WH).

As shown in FIG. 4, FIG. 5 and FIG. 13A, attachment holes 61 are formed in an outer portion, in the vehicle width direction, of a flange 63 as being arrayed in the vehicle width direction. The flange 63 is formed in a base portion of the harness holding member 60. The attachment holes 61 are usable to attach the harness holding member 60 to the front portion of the harness supporting bracket 50. The attachment holes 61 formed in the harness holding member 60 and the attachment holes 54 formed in the front portion of the harness supporting bracket 50 are tightened and secured to each other by tightening members such as, for example, bolts B5 and nuts N5.

The harness holding member 60 includes a cylindrical harness holding portion 62 to the front of the flange 63. The harness holding portion 62 extends inward in the vehicle width direction from a position where the harness holding member 60 is attached to the harness supporting bracket 50 and supports one end of the wire harness (WH).

The harness holding portion 62 is located to face the females connectors 22, formed in the front portion 20e of the accessory 20, at a position to the front of, and below, the female connectors 22. Although not shown, male connectors (not shown) provided at one end of the wire harness (WH) held by the harness holding portion 62 are connected with the female connectors 22 formed in the front portion 20e of the accessory 20 via appropriate connection cables (not shown).

The wire harness (WH), although not shown, is routed between the harness holding portion 62 and the motor for the rear deck cover 3, and between the harness holding portion 62 and the motor for the openable/closable roof 1. Power converted into an appropriate power value by the accessory 20, which is the power control device, is supplied to each of the motors.

The above-described automobile accessory attachment structure 10 is structured such that the openable/closable roof 1 and the rear deck cover 3 are openable and closable, and has an opening 2a, formed above the vehicle compartment 7 or the roof chamber 2, opened in the state where the openable/closable roof 1 or the rear deck cover 3 is opened. Therefore, an area between the vehicle compartment 7 and the roof chamber 2 is a water-coverable area that may be covered with water at the time of raining or the like. Namely, the accessory 20 is provided on the seatback crossmember 16 extending in the vehicle width direction in the water-coverable area between the vehicle compartment 7 and the roof chamber 2. The accessory 20 is housed in the metal housing 21 and has the female connectors 22 formed in the front portion 20e.

The automobile accessory attachment structure 10 includes the cover 30, which covers the accessory 20 and is foldable upward, and also includes the harness supporting bracket 50 pressing the cover 30 such that the cover 30 is not foldable. Therefore, the automobile accessory attachment structure 10, while suppressing the number of components thereof from increasing, guarantees that waterproofness is provided for an accessory, which needs to be protected against water, even in the case where the accessory is located in a water-coverable area.

This will be described in more detail. With the automobile including a retractable roof in this example, in the case where the openable/closable roof 1 in a roof closed state as shown in FIG. 1A is to be accommodated in the roof chamber 2 as being folded as shown in FIG. 1B, the openable/closable roof 1 is not started to be displaced after the rear deck cover 3 is completely lifted up, but while the rear deck cover 3 is being lifted up. Thus, the openable/closable roof 1 is opened or closed smoothly.

While the openable/closable roof 1 and the rear deck cover 3 are displaced, there may be a timing when both thereof are displaced at the same time. Therefore, the motor provided in the link mechanisms 6 for the rear deck cover 3 and the motor provided in the rear mechanism for the openable/closable roof 1 need to be driven at the same time. In addition, the rear deck cover 3 is longer in the front-rear direction to be heavy. For reasons including the above-described reason, the accessory 20 needs to supply a large electric current from at least one of a power generator and a battery separately provided (power supply device) to the motor provided in the link mechanisms 6 for the rear deck cover 3 and the motor provided in the link mechanism for the openable/closable roof 1.

Therefore, it is important to decrease the power loss between the accessory 20 and the motors provided in the link mechanisms for the rear deck cover 3 and the openable/closable roof 1. It is preferred that the accessory 20 is located as close as possible to the mechanisms for the rear deck cover 3 and the openable/closable roof 1.

Under such a situation, in this example, the accessory 20 is attached to the seatback crossmember 16 located in the area between the vehicle compartment 7 and the roof chamber 2, although this area is a water-coverable area, so that the power loss is suppressed while an appropriate layout is guaranteed as described below.

In addition, the accessory attachment structure 10 in this example covers the accessory 20. Therefore, even if the accessory 20 is located in the water-coverable area, the cover 30 guarantees the waterproofness. Especially in this example, the cover front top portion 31 included in the cover 30 firmly covers the front portion 20e in which the female connectors 22, which are easily electrolytically corroded by water, are provided.

The cover 30 is formed such that at least a part thereof (cover front top portion 31) may be rolled up at the time of, for example, assembly, maintenance or the like.

In this example, the harness supporting bracket 50 is used to press the cover 30 from above such that the cover front top portion 31 of the cover 30, which may be rolled up, is not rolled up inadvertently. Namely, the harness supporting bracket 50 is also used as a member pressing the cover front top portion 31. Thus, there is no need to separately provide a pressing member.

Therefore, the accessory, which needs to be protected against water, may be located in the water-coverable area while the number of components and the number of assembly steps are suppressed from increasing.

In an embodiment of the present invention, the cover front top portion 31 of the cover 30 includes the plurality of panels 37 and the plurality of hinges 38.

With the above-described structure, the cover front top portion 31 of the cover 30 includes the thin hinges 38 (38a, 38b) along which the cover front top portion 31 is foldable. Therefore, the cover 30 is foldable with certainty. The cover front top portion 31 of the cover 30 includes the panels 37 thicker than the hinges 38. Therefore, the cover 30 is rigid with certainty when being pressed and secured by the harness supporting bracket 50.

Such foldability and rigidity of the cover 30 are guaranteed by the thin hinges 38 and the panels 37 thicker than the hinges 38. With such a structure, the cover 30 may be integrally formed of a material such a resin or the like. The cover 30 may be formed of such a low-cost material.

In an embodiment of the present invention, the accessory 20 is a power control device commonly usable for the openable/closable roof 1 and the rear deck cover 3. The power control device is provided with the metal housing 21.

With such a structure, the outer casing of the accessory 20 is the metal housing 21. Therefore, as compared with a conventional structure in which the accessory is entirely housed in a resin case, coolability (heat dissipation) is guaranteed to be higher and the cost is decreased.

The accessory 20 is a power control device commonly usable for the openable/closable roof 1 and the rear deck cover 3. Therefore, it is preferred from the point of view of layout that the accessory 20 is located between the vehicle compartment 7 and the roof chamber 2.

In this example, the accessory 20 is provided with the metal housing 21. The accessory 20 is covered with the cover 30, and therefore, may be located even in the water-coverable area between the vehicle compartment 7 and the roof chamber 2 without being covered with water.

In this case, a bottom portion of the accessory 20 does not need to be covered with the cover 30. This improves the ventilation and the heat dissipation.

Therefore, the accessory 20 has a good layout with certainty as a power control device commonly usable for the openable/closable roof 1 and the rear deck cover 3.

There is a tendency that automobile-mountable devices are not located in a water-coverable area because there is a risk of malfunction in the case where the automobile-mountable devices are covered with water. Therefore, the density of the automobile-mountable devices in the water-coverable area is lower than in a non-water-coverable area. For this reason also, it improves the appropriateness of the layout to locate the accessory 20 in the water-coverable area.

The water-coverable area is opened to the outside of the vehicle body, and thus has high ventilation. The accessory 20 is provided with the metal housing 21 is further improved in the coolability when being located in such a water-coverable area.

Especially in this example, the entirety of the accessory 20 is not covered with the cover 30, but the cover 30 is provided to cover the accessory 20 from above. This improves the coolability of the accessory 20 at low cost while providing waterproofness to the water-coverable area.

As described above, the accessory attachment structure 10 in this example has the accessory 20 located in the water-coverable area to improve the appropriateness of the layout. The waterproofness of the accessory 20 located in the water-coverable area is provided with certainty by the cover 30, and the accessory 20 is provided with the metal housing 21 to improve the coolability. Thus, the coolability and the appropriateness of layout are both provided at low cost.

The metal casing according to the present invention corresponds to the metal housing 21 in the above-described example; and similarly, the connector corresponds to the female connector 22. The present invention is not limited to having the structure in the above-described example.

For example, the accessory 20 is a power control device commonly usable for the openable/closable roof 1 and the rear deck cover 3 as described above. The accessory 20 is not limited to this, and may be a power control device for either one of the openable/closable roof 1 and the rear deck cover 3. The accessory 20 is not limited to a power control device such as an inverter or the like, and may be another automobile-mountable device, for example, another power supply device such as a battery or the like.

The accessory 20 may be a part of a mechanical pivoting detection device that detects a pivoting state of a link mechanism, instead of the power control device. In this case, a wire holding case that holds a wire provided in the mechanical pivoting detection device may be provided instead of the harness holding member 60. The wire holding case, although not shown, may be of a structure that holds an end of a wire routed to be supplied with a tension when the link is actuated and also converts the tension applied to an end of the wire held by the holding portion into an electric signal and transmits the electric signal to the pivoting detection device provided as the accessory.

Such a mechanical pivoting detection device may be provided in the vehicle together with an electric pivoting detection device (not shown). In this case, even if the electric pivoting detection device is out of order, the mechanical pivoting detection device detects the pivoting state of the link mechanism to improve the detection precision.

In the above-described example, the electric control device as the accessory 20 is attached to the seatback crossmember 16 to the rear of the seatback. The accessory 20 is not limited to this, and there is no specific limitation on the position of the accessory 20. The accessory 20 may be attached to any position in in the water-coverable area, for example, to a crossmember (not shown) extending in the vehicle width direction in a rear portion of the vehicle, more specifically, a diagonal member coupling left and right wheelhouses or between left and right wheel supporting members, or a bulkhead partitioning the chamber and the vehicle compartment 7 from each other.

The cover 30 includes the top portion 30a, the vehicle width direction inner portion 30b, the vehicle width direction outer portion 30c, the rear portion, and the cover front top portion 31. It is sufficient that the cover 30 includes at least the cover front top portion 31 and the support portions 36.

INDUSTRIAL APPLICABILITY

As described above, the present invention is useful for an automobile accessory attachment structure attaching an accessory including a connector in a water-coverable area of a vehicle body.

REFERENCE SIGNS LIST

10 . . . Accessory attachment structure
20 . . . Accessory
21 . . . Metal housing (metal casing)
22 . . . Female connector (connector)
30 . . . Cover
37 . . . Panel
38 . . . Hinge
50 . . . Harness supporting bracket

The invention claimed is:

1. An automobile accessory attachment structure, an accessory, provided with a metal casing or including a connector, being provided in a water-coverable area of an automobile including a retractable roof, the automobile accessory attachment structure comprising:
   a cover covering the accessory; and
   a harness supporting bracket pressing the cover such that the cover is not folded,
   wherein the cover covers a top portion, a vehicle width direction inner portion, a vehicle width direction outer portion and a rear portion of the accessory, and wherein the cover is foldable upward when the harness supporting bracket is detached.

2. The automobile accessory attachment structure according to claim 1, wherein the cover includes a plurality of panels and a plurality of hinges.

3. The automobile accessory attachment structure according to claim 1, wherein the accessory is a power control device usable for the roof or a deck cover or commonly usable for the roof and the deck cover, and the power control device is provided with the metal casing.

4. The automobile accessory attachment structure according to claim 1, further comprising a front top portion that protrudes so as to cover at least a front portion of the accessory.

* * * * *